United States Patent
Grey et al.

[15] 3,700,119
[45] Oct. 24, 1972

[54] TABLE EXTENSION FOR A BALE WAGON

[72] Inventors: Donald M. Grey; Jerry W. Welker, both of Selma, Calif.

[73] Assignee: Sperry Rand Corporation, New Holland, Pa.

[22] Filed: April 26, 1971

[21] Appl. No.: 137,601

Related U.S. Application Data

[63] Continuation of Ser. No. 828,881, May 29, 1969, abandoned.

[52] U.S. Cl. .................................. 214/6 B, 56/228
[51] Int. Cl. ............................................ B65g 60/00
[58] Field of Search ............ 214/6 B, 42 R; 56/228; 100/188; 298/7 BL

[56] References Cited

UNITED STATES PATENTS

| | | | |
|---|---|---|---|
| 3,502,230 | 3/1970 | Grey et al. | 214/6 B |
| 2,947,400 | 8/1960 | Murray et al. | 100/188 R |
| 2,767,866 | 10/1956 | Heinje | 214/42 R |
| 2,458,994 | 1/1949 | Hill | 100/188 R |
| 3,300,068 | 1/1967 | Tarrant, Sr. | 214/83.36 |
| 3,161,008 | 12/1964 | Shepley et al. | 100/188 X |
| 1,730,225 | 10/1929 | MacGregor | 56/228 |
| 3,243,028 | 3/1966 | Tufts | 100/188 R |
| 3,224,614 | 12/1965 | Yeary | 214/16.4 RX |

FOREIGN PATENTS OR APPLICATIONS

| | | | |
|---|---|---|---|
| 965,570 | 7/1964 | Great Britain | 56/228 |

*Primary Examiner*—Robert J. Spar
*Attorney*—Joseph A. Brown, John C. Thompson, James J. Kennedy and George C. Bower

[57] ABSTRACT

A table extension for the transfer table on a bale wagon which is adapted to be selectively positionable with respect to the table between a first bale engaging, guiding and turning position and a second stored position.

1 Claim, 6 Drawing Figures

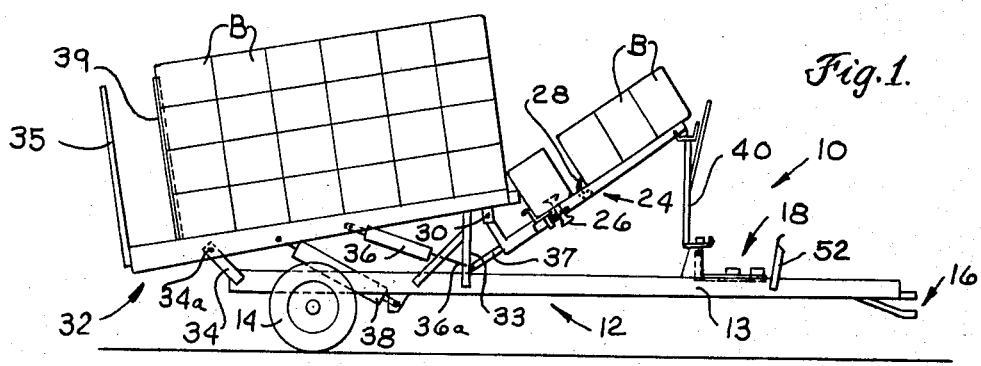
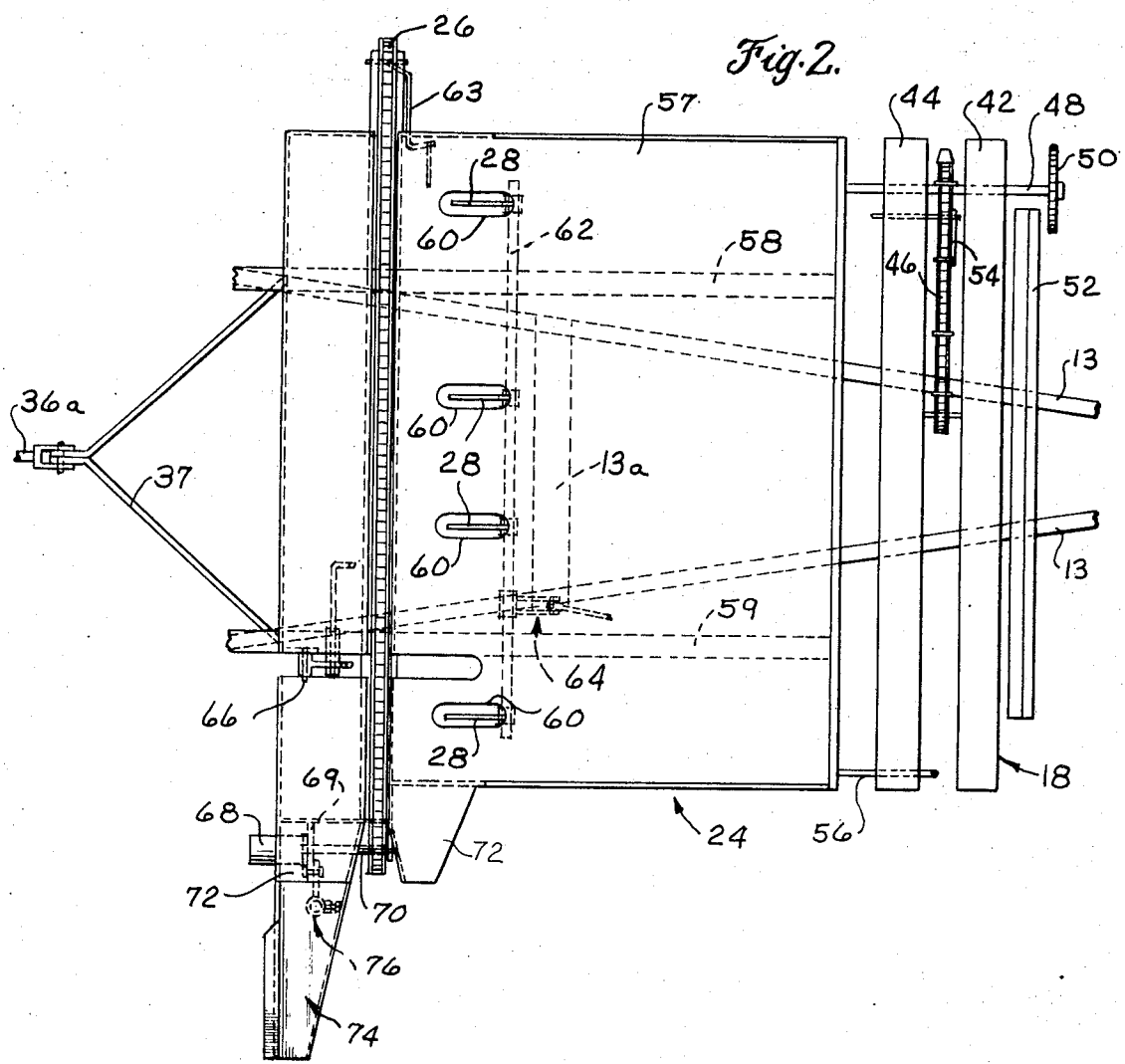
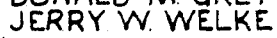

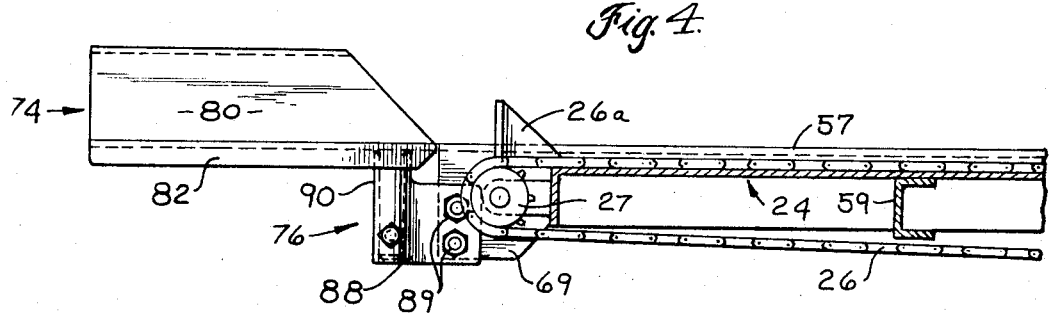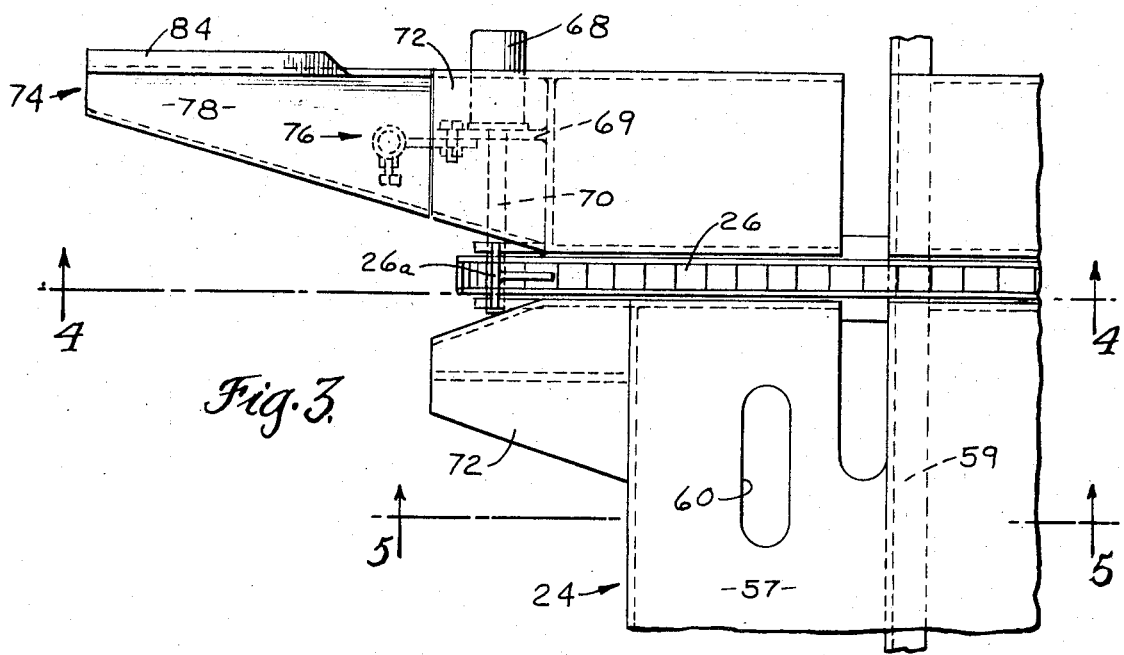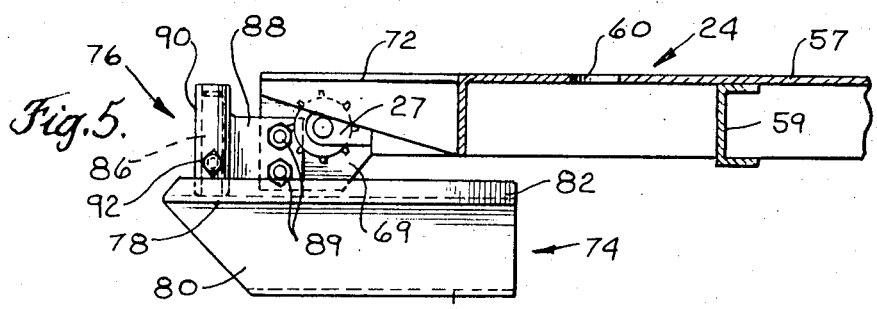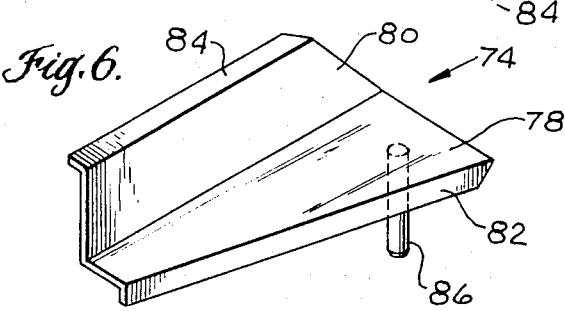

TABLE EXTENSION FOR A BALE WAGON

This application is a continuation of applicants' earlier filed copending application, Ser. No. 828,881 filed May 29, 1969, now abandoned.

BACKGROUND OF THE INVENTION

The present invention relates generally to agricultural machinery, and specifically to a bale wagon which is capable of unloading bales from a wagon one bale at a time using a table extension to guide each bale and impart to it a quarter turn for proper placing of the bale on a barn elevator.

As the hay bales are formed in a conventional baling machine, they exit from the bale forming chamber with their widest width dimension lying flat in the chamber. Before the bales can be picked up by an automatic bale wagon, the bales must be properly orientated so that they lie on the ground on their narrowest side. This can be done by providing means on the baler itself or by providing other known bale turning apparatus. The bale wagon will then approach the bales with the bales lying on their sides in a fore-and-aft disposition with respect to the bale wagon. In this way the pickup on the bale wagon engages the bales, lifts it, turns it so that it lies on its widest side and places them on the first bale receiving table for accumulation. The bales are further accumulated on other beds on the wagon until they are finally placed in tier form on the load carrying bed with their widest dimension forming a base for engagement with the wagon and other bales in the stack. This method of picking up bales from the field and stacking them on the wagon is well known in the art and has been particularly shown and described in the U. S. Pat. No. 2,848,127 issued to Grey on Aug. 19, 1958.

With the advent of further refinements and developments in the Grey type wagon which have taken place, a wagon capable of unloading bales one at a time has evolved. This wagon is shown and described in a copending application Ser. No. 755,141, filed Aug. 26, 1968, and permits automatic bale wagon as described in the Grey patent to single bale unload a wagon directly into a hay mow or feeding trough.

In most cases where the farmer intends to store his baled hay in a barn or mow, he is required to elevate at least a portion of the hay bales from a wagon discharge station on the ground into the desired stored location. The conventional barn elevators which are used by most farmers to lift bales from the ground up into the barn require that the bales be placed between the elevator flights on the bale's widest edge. This presents a particular problem for the single bale unloading wagon because the bales are discharged from the transfer table and the bales are disposed on the bed not on their widest edge, but on their narrower edge.

To fully appreciate the advantages of these fully automatic pieces of equipment and to make them compatible with existing structure or equipment, it is necessary to insure proper orientation of the bales as they leave the wagon before they are engaged by the bale elevator.

SUMMARY OF THE INVENTION

Accordingly, then, it is a primary object of this invention to provide additional structure for a bale wagon, which, when combined with existing wagon structure, will permit automatic reorientating of the hay bales as they are discharged from the wagon into a barn elevator, or other equipment.

Another object of this invention is to provide such additional structure in the form of a table extension which will guide and turn the bales as they are discharged.

A further object of the invention is to provide a table extension which cooperates with the bale wagon discharge conveyor to guide and turn the unloading bales.

A still further object of the invention is to provide a table extension which is selectively positionable between an operative position and a stored position.

Another object of the invention is to provide a structure which will be simple to install and operate and not require that additional manpower be employed to operate the device or operate on the bales.

Other objects will be apparent hereinafter from the specification and from the recital in the appended claims.

BRIEF DESCRIPTION OF THE DRAWINGS

FIG. 1 is a diagrammatic side view illustrating a single bale unloading wagon equipped with a readily attachable bale unloading extension;

FIG. 2 is a plan view looking straight down at the face of the inclined unloading table of FIG. 1;

FIG. 3 is an enlarged fragmentary plan view of the discharge end of the table with the extension applied;

FIG. 4 is a section view taken along line 4—4 of FIG. 3;

FIG. 5 is a section view taken along the line 5—5 of FIG. 3, but showing the extension in the inverted, extending underneath the table in its operative stored position; and FIG. 6 is an isometric view of the table extension.

DESCRIPTION OF THE PREFERRED EMBODIMENT

Referring now generally to the drawings, and specifically to FIG. 1, an automatic bale wagon 10, of the type described in the aforementioned application and Ser. No. 755,141, and assigned to the present assignee, is comprised of a frame structure 12 having a pair of fore-and-aft extending channel sections 13, being supported rearwardly on a pair of spaced apart wheels 14 (only one shown) and being further comprised of cross frame members 13a. As can be seen in FIG. 2, the channel sections 13 converge at the forward end and are provided with a hitch assembly 16 which adapts the wagon to be hitched behind a tractor, or other pulling vehicle, not shown, for movement over the ground.

Mounted on the frame structure 12, rearwardly of the hitch portion 16, is a bale receiving table 18 which accepts and accumulates a series of individual bales which are directed thereto from the ground by a pick-up mechanism, not shown, but well known in the art. The receiving table 18 is pivotally mounted with respect to the frame structure 12 at point 20 on support bracket 22, and after the requisite number of bales have been accumulated on the bed, the bed is automatically pivoted upwardly so that the accumulated bales are deposited on a second, or transfer bed 24. The disposition of the bales on the transfer table is illustrated in FIG. 1, namely, the bales are disposed along a narrow edge on the table abutting with each other along their wider edge.

The transfer bed 24 is disposed on the wagon frame structure rearwardly of bed 18 and extends generally in a horizontal direction (not shown) when it is disposed in its normal bale receiving position. The bed 24 is provided with a cross conveyor 26 and a plurality of pivotal bale hooks 28 whose function will be described hereinafter. The transfer bed, like the receiving bed is adapted to accumulate successive bales, forming a tier of bales thereon, and upon completion of the tier the bales are transferred to a load carrying bed 32 which is disposed further rearwardly on the frame 12.

A linkage 34 is fixed by one end to the frame structure 12, while at the other end it is pivotally connected at 34a to load carrying bed 32, as shown in FIG. 1. The bed 32 is supported at its forward end by supports 33, only one being shown, which extend upwardly from the fore-and-aft extending beams 13 adapting the load bed to be carried in a generally inclined manner during normal operation as shown. At the extreme rear end of the load bed 32 there are provided a plurality, only one shown, of upwardly extending fork members 35 which are adapted to provide a back stop for the loaded bale wagon and to support the stack of bales on the bed during transport and during the stack discharging or retrieving operation.

A power cylinder 36 is disposed under bed 32 and is connected by one end thereto and by the other end to a link 37 which is fixed to and extends generally rearwardly from the transfer table 24. Operation of the cylinder 36, by means not shown, causes piston rod 36a to subject the linkage 37 to a downward force causing the transfer table 24 to pivot about its pivot point 30 to deposit a tier of bales on the load carrying bed.

Another power cylinder 38 is disposed beneath load carrying bed 32 and is operatively connected between wagon frame 12 and the underside of the load bed. This cylinder is adapted to pivot the load bed about point 34a with respect to the wagon frame to permit unloading of an entire stack of bale or retrieving the entire stack if that operation is desirable. If the wagon is to be used solely for single bale unloading then that particular cylinder would not be used since the load bed is kept in its generally inclined position not shown in FIG. 1.

Mounted on the load bed 32 and powered by another hydraulic cylinder, not shown, is a movable load rack, or rolling rack 39 which is comprised of a plurality (only one shown) of upstanding fork or tine members extending perpendicularly to the load bed surface and movable in a fore-and-aft direction thereon. During single bale unloading the load rack is advanced toward the front of the wagon a distance of one tier so that the bales are deposited on the inclined transfer table 24 for discharge therefrom one bale at a time. To insure that the transfer table 24 will remain in its inclined position for single bale unloading, shown in FIG. 1, a table support 40 is mounted on supports 22 rearwardly of the receiving table 18 and extends upwardly to support the forward end of table 24.

Looking more at the details of the construction of the bale wagon 10, and referring more specifically to FIG. 2, it can be seen that receiving bed 18 is comprised of a pair of horizontally extending spaced apart floor rails 42 and 44, and a conveyor 46 which is driven from drive sprocket 50 through shaft 48. The drive sprocket 50 is driven from a suitable power source such as a tractor PTO or other wagon or towing vehicle, not shown, in a manner well known in the art.

A front bale guard 52 is mounted on the wagon frame structure 12 forwardly of the horizontal floor rails 42 and 44 and is adapted to confine the bales to a transversely extending direction with respect to the bale wagon frame and with respect to movement of the wagon over the ground. As the bales are introduced to the bale receiving table 18 from the pick-up, not shown, they are first engaged by the conveyor 46 for movement across the table. Just after being received on the table the bales B contact a first trip lever 54 which will prevent actuation of the receiving table 18 before it is fully loaded. A trip 56 is disposed at one end of receiving table 18 and will move in response to contact with a bale to cause actuation of the power means, not shown, to lift the receiving table up so that the bed's accumulated bales are deposited along the forward edge of table 24. The specific operation of these levers and the interlock between lever 54 and lever 56 is more fully explained in U. S. Pat. No. 3,330,424, issued July 11, 1967, to Grey et al. A further discussion will not be made of this particular feature of the wagon since it forms no part of the present application.

The transfer table 24 is comprised of a generally planar surface 57 which is supported on frame members 58 and 59. The surface 57 of the table, is provided with a plurality of elongated apertures 60 through which the bale hooks 28 are adapted to be pivoted upwardly out of the plane of the table surface. The bale hooks are shown in their upwardly extending position in FIG. 1. Each of the bale hooks 28 is mounted on a shaft 62, disposed beneath the table 24 and pivotally mounted with respect thereto in response to the bale hook tripping mechanism 63 and pivoting means 64. A second table trip lever 66 extends upwardly through the table surface rearwardly of the conveyor 26 and is movable in response to engagement with a full tier of bales being placed on the transfer table to cause power cylinder 36 to be actuated so that the table 24 is pivoted upwardly and the bale tier thereon is deposited on bed 32.

The cross conveyor 26, which extends transversely from side to side of the transfer bed 24 generally in the plane of surface 57, is comprised of two conveyor paddles 26a which are equally spaced along the length of the chain. A fluid motor 68 is located on a mounting flange 69 which depends from the surface of table 24 as shown in detail in FIGS. 3, 4 and 5. A drive shaft 70 interconnects the fluid motor 68 with a sprocket 27 at the end of the shaft over which the conveyor chain rides. Upon proper actuation of the fluid motor 68, bale hooks 60 are rotated upwardly by means, not shown, where they engage the upper most bales on the table forcing them to separate from the lower two bales which are disposed over the cross conveyor 26, as shown in FIG. 1, and the cross conveyor chain is driven across the table (from top to bottom as viewed in FIG. 2 of the drawings). The trip mechanism 63 which is located on the opposite side of the table from the drive motor, is adapted to engage one conveyor paddle to thereby trip the pivoting mechanism 64 to cause the bale hooks 60 to move downwardly, permitting the remaining bales to slide down the table for subsequent unloading. Successive operation in this manner permits unrestricted discharge, one bale at a time, of a complete bale tier from the inclined table 24.

A pair of integral table extensions 72 extend outwardly from and are part of one side of the transfer table 24, as shown in detail in FIGS. 2 through 5. These integral table extensions are provided on either side of the conveyor chain 26 and the upper surfaces thereof form a plane which is co-extensive with the planar surface 57 of the table.

A selectively movable table extension 74 is adapted to extend outwardly from one of the integral table extensions 72 to support, guide and turn hay bales as they are discharged from table 24 by the cross conveyor chain. The table extension 74, shown in detail in FIG. 6, is provided with a mounting means 76. The extension 74 is a generally L-shaped structure having a flat bottom surface 78 and an upstanding wall 80 extending transversely therefrom. The surface 78 is provided with a down turned flange 82, while the vertically extending surface 80 is provided with an out turned flange 84, as shown in FIG. 6. A mounting rod 86 is fixed to the underside of flat surface 78 and extends transversely downwardly therefrom. A mounting bracket 88 is fixed to flange 69 by means of bolts 89, or any other suitable connecting means. The mounting bracket is connected to a tubular member 90 which is adapted to receive mounting rod 86, and in combination with the set screw 92, table extension 74 is fixed relative to one of the integral extensions 72 as, shown in FIGS. 3 and 4.

When the table extension 74 is in its first operative position the flat surface 74 extends outwardly away from the transfer table surface 57 in generally co-planar relation. This permits the bales to move over the surface of the table without interruption. As bales move across table 24 in single bale fashion, they move outwardly over the integral extensions 72 and into engagement with movable table extension 74. The bales are disposed as shown in FIG. 1 during discharge and since the lower surface of extension 74 is tapered, the hay bales are caused to take a quarter turn as they fall from engagement with surfaces 78 and 80. This causes proper positioning of the bales with respect to a bale elevator into which the bales are being discharged to permit them to be lifted by the bale elevator, on their wide edge, into the storage facility. Without the table extension 78, the bales would fall off directly into the elevator along their narrower edge and, therefore, the bales would not be properly positioned for delivery to the bale elevator.

As shown in FIG. 5, the table extension 74 is also adapted to assume a second or stored position in which it extends underneath the table. This is accomplished by manually loosening set screw 92 and moving the rod 86 from its holder 90 and then inverting the extension so that rod 86 is then received in holder 90 by the bottom thereof. By again manually turning the set screw down on the rod 86, the entire table extension is carried in its stored position. In this manner, the extension is always handy to the operator and it is a simple matter to move the extension to stored position from its operative position and vice versa. When the extension is in its stored position it fits safely and neatly under the transfer table 24 so that it does not engage other objects or other persons when the bale wagon is in use in the field.

Briefly then, describing the operation of the machine, bales B are picked up from the field as the automatic bale wagon 10 moves thereover and are first accumulated on receiving table 18. After the requisite accumulation on table 18 has occured, the table is automatically pivoted to an up position whereupon the accumulated bales are placed on the transfer table 24. Transfer table 24 then accumulates enough bales to form a single bale tier and after so doing, it to is automatically pivoted upwardly placing the bale tier on the load carrying bed 32. The load bed then will accumulate a series of bale tiers permitting their transport from the field to a storage area. Upon arrival at the storage area, the second or transfer table 24 is moved to the inclined position, shown in FIG. 1, and the rolling rack 39 is activated so that it moves forward one tier at a time along the bale carrying bed 32 permitting a tier to fall or topple onto the inclined bed of table 24. The cross conveyor 26 is then activated and the bale hooks 28, by means not shown, are automatically caused to pivot upwardly through the surface of table 24 to engage the upper most bales and separate them from the lowermost layer of bales. The cross conveyor then moves the lowermost bale layer transversely across the table out onto the integral table extension 72 where they are supported and guided. Finally, the bales are moved into engagement with the selectively positionable table extension 74 which has been previously moved to its first operative position. The bales slide outwardly away from the bed 57 of the transfer table and engage surfaces 78 and 80 of the table extension 74. Since the lower surface 78 of the bale extension is tapered, and because the bales are now only supported under a portion of their entire width, the bales are discharged from the wagon and from the table extension with a one quarter revolution. In other words, the bale is deposited in the mouth of a bale elevator so that its widest edge, or the bottom of the bale, is in engagement with the bottom of the elevator trough (not shown).

While this invention has been described in connection with a single embodiment thereof, it will be understood that this embodiment will be capable of modification and that this modification is intended to cover any variations, uses, or adaptations following in general, the principles of the invention and including such departures from the present disclosure as come within the known or customary practice in the art to which the invention pertains, and as fall within the scope of the invention or the limits of the appended claims.

We claim:
1. A bale wagon comprising:
a wheel supported frame structure adapted for travel over the ground;
bed means on said frame structure, said bed means being adapted to receive and accumulate successive bales of hay at one end thereof;
means on said bed means for discharging successive bales therefrom, one bale at a time; and
an L-shaped bed extension structure comprising a flat bottom surface having a tapered edge portion extending from a relatively wide inward end to a relatively narrow outward end and a vertically extending side surface, said L-shaped structure being selectively positionable between an outwardly extending bale engaging and guiding position for turning successive bales one quarter revolution about the length of the bale as said bales move relative to said tapered bottom surface and a stored position, said L-shaped structure being mounted on said bed means with said flat tapered bottom surface being coextensive with the surface of said bed means in the bale engaging and guiding position and said structure being spaced from and disposed below in an inwardly extending position beneath said bed means in the stored position.

* * * * *